(12) United States Patent
Levy et al.

(10) Patent No.: US 11,449,261 B2
(45) Date of Patent: Sep. 20, 2022

(54) LOW LATENCY DATA MIRRORING IN A LARGE SCALE STORAGE SYSTEM

(71) Applicant: VAST DATA LTD., Tel Aviv (IL)

(72) Inventors: Asaf Levy, Tel Aviv (IL); Hillel Costeff, Tel Aviv (IL); Avi Goren, Tel Aviv (IL); Vlad Zdornov, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/180,686

(22) Filed: Feb. 19, 2021

(65) Prior Publication Data
US 2022/0269412 A1 Aug. 25, 2022

(51) Int. Cl.
*G06F 12/00* (2006.01)
*G06F 3/06* (2006.01)
*G06F 11/07* (2006.01)

(52) U.S. Cl.
CPC .............. *G06F 3/065* (2013.01); *G06F 3/064* (2013.01); *G06F 3/067* (2013.01); *G06F 3/0619* (2013.01); *G06F 11/0772* (2013.01)

(58) Field of Classification Search
CPC ........ G06F 3/065; G06F 3/0619; G06F 3/064; G06F 3/067; G06F 11/0772
See application file for complete search history.

(56) References Cited

U.S. PATENT DOCUMENTS

2008/0183922 A1* 7/2008 Sampathkumar ... G06F 11/2082
710/59

* cited by examiner

*Primary Examiner* — Jason W Blust
(74) *Attorney, Agent, or Firm* — Reches Patents

(57) ABSTRACT

A method for low-latency data mirroring in a storage system, the method may include receiving, by a compute node of the storage system, a read request for reading a data unit stored at a primary storage block of the storage system; determining, by the compute node and based on primary storage block metadata, whether a content of the primary storage block is consistent; and responding to the determining of whether the content of the primary storage block is consistent. The responding may include (a) when determining that the primary storage block is inconsistent—copying the data unit from the primary storage block to a secondary storage block of the storage system, and updating the primary storage block metadata; and (b) reading the data unit from the primary storage block and sending the data unit to a requesting entity.

21 Claims, 7 Drawing Sheets

Receiving, by a compute node of the storage system, a read request for reading a data unit stored at a primary storage block of the storage system. 610

↓

Determining, by the compute node and based on primary storage block metadata, whether a content of the primary storage block is consistent. 620

↓

Responding to the determining. The responding may include copying the data unit from the primary storage block to a secondary storage block of the storage system, and updating the primary storage block metadata, when determining that the primary storage block is inconsistent, and reading the data unit from the primary storage block and sending the data unit to the requesting entity.
630

LOW LATENCY DATA MIRRORING IN A LARGE SCALE STORAGE SYSTEM

TECHNICAL FIELD

The present disclosure generally relates to the field of data storage, and more particularly to data minoring in storage systems.

BACKGROUND

Mirroring, in data storage systems, is the process of replicating data from one device onto one or more storage devices in real time, when data is being written to the storage system.

Mirroring is typically synchronous, and as such, an entity that issued a write request (e.g., a client device) expects that the write request will be acknowledged to confirm that the data of the write request is written to all the copies, and further expects that even upon recovery from failures that interrupted the writing—all copies are identical.

Upon disaster recovery, where the primary copy is damaged or non-operational, the mirrored copy enables a failover for data, assuming to have the exact same content of the primary copy before the failure, so that subsequent access requests can be redirected to the mirrored copy.

The managing of mirroring can be complicated and time consuming—especially in centralized high throughput storage systems.

There is a growing need to provide an efficient mirroring mechanisms.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

There may be provided a method for low-latency data mirroring in a storage system, the method may include receiving, by a compute node of the storage system, a read request for reading a data unit stored at a primary storage block of the storage system; determining, by the compute node and based on primary storage block metadata, whether a content of the primary storage block is consistent; responding to the determining of whether the content of the primary storage block is consistent; wherein the responding comprises: when determining that the primary storage block is inconsistent—copying the data unit from the primary storage block to a secondary storage block of the storage system, and updating the primary storage block metadata; and reading the data unit from the primary storage block and sending the data unit to a requesting entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1A illustrates an example of a method.

DETAILED DESCRIPTION

Figure 1B:
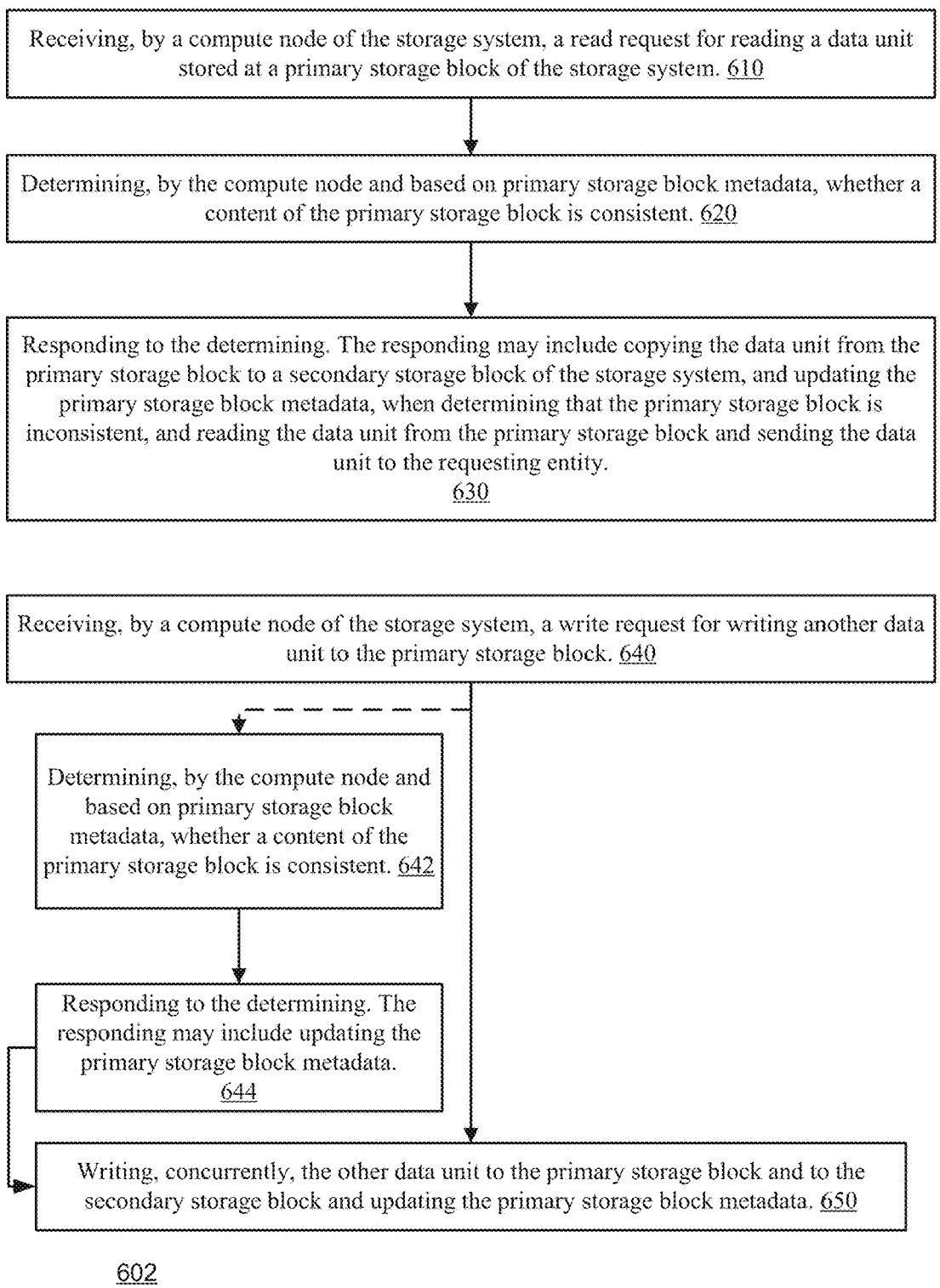
FIG. 1B illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There is provided a system, a method and a non-transitory computer readable medium for low latency data mirroring in a storage system such as a large scale storage system. A large scale storage system may include tens, hundreds, thousands, hundred-thousands and even more storage nodes and tens, hundreds, thousands, hundred-thousands and even more compute nodes. A storage node may include multiple storage devices such as a volatile storage device, and non-volatile storage devices. A storage device may include a Solid State Device (SSD), a non-volatile random access memory (NVRAM), a volatile random access memory (RAM), and the like.

Non-limiting examples of compute nodes and storage nodes are illustrated in US patent application 2019/0141128 which is incorporated herein by reference.

For simplicity of explanation some of the following text may refer to a method.

There may be provided a method for performing a mirrored writing, by writing a data unit of a write request to a primary storage block and to a secondary storage block, in parallel, where the primary storage block and the secondary storage block may belong to different storage devices of a storage system. Various storage devices of the storage system include multiple primary storage blocks, for storing data units. Various storage devices of the storage system may include multiple secondary storage blocks for storing copies of the data units.

A data unit and a storage block (primary storage block and secondary storage block) may be of any size. A storage block may store a part of a data unit, a data unit or more than a single data unit. A storage block may be a physical or logical entity.

Each primary storage block is associated with primary storage block metadata for indicating a consistency status of the primary storage block. The consistency status may be used for resolving inconsistency conditions or for resolving suspected inconsistency conditions, for example—in various cases of actual or suspected failures. An inconsistency condition may occur when the content of a primary storage block and a corresponding secondary storage block is not identical, or where the identity is not guaranteed or verified to be identical.

There are multiple instances of primary storage block metadata that correspond to the multiple primary storage blocks. The multiple instances of primary storage block metadata may be stored in different storage devices, and optionally may be stored in different types of storage devices, from the storage devices that includes the multiple primary and secondary storage blocks.

For example, while the primary and secondary storage blocks may be included in nonvolatile devices, the multiple instances of primary storage block metadata may be stored in a volatile memory, e.g., RAM, or in a non-volatile memory that is faster than the non-volatile devices that include the multiple primary and secondary storage blocks. Therefore, the additional latency caused by accessing the primary storage block metadata upon each write request is reduced. Since the instances of primary storage block metadata may reside in a volatile memory, measures are taken when the instances of primary storage block metadata are erased upon e.g., a power failure that erases the volatile memory, or a failure of the device that stores them.

A consistent state may be achieved when the content of a primary storage block and the content of a secondary storage block are equal to each other.

An inconsistent state can be indicated when:

(i) a general potential inconsistency is observed (e.g., after a power loss that erases the primary storage block metadata).

(ii) During a mirrored write that is being performed by a compute entity.

(iii) a failure of the compute node that performs the mirrored write, that occurs during the execution of the mirrored write.

During the mirrored write (case (ii)) the primary storage block is temporarily inconsistent while the write is being performed, and no other access is allowed during the execution of the mirrored write and until it is confirmed by the writing compute node that the consistency is restored (by writing the data unit to both primary and secondary storage blocks).

The primary storage block may serve as the source of the data unit stored therein, so that in a case of a potential inconsistency between the two storage locations (that is not a temporal condition, e.g., during write), the potential inconsistency is resolved by copying the data unit stored in the primary storage block to the secondary storage block.

Failures may be resolved on the fly, upon read and write requests that detect potential inconsistencies.

After a power failure—all instances of primary storage block metadata that were affected by the power failure are set to indicate a potential inconsistency. So, a first access to any one of the impacted primary storage blocks, after a power failure, should be used to resolve the inconsistency. The same mechanism may be applied to any other failure that caused erasure of the instances of primary storage block metadata.

The primary storage block metadata may be indicative of an access-granted compute node that currently performs the mirrored write (i.e., performs writing to the primary storage block and also writing to the secondary storage block associated with the primary storage block metadata). Once granted access to the primary storage block, the access-granted compute node may update the primary storage block metadata to indicate the grant of access to the primary storage block (this may include updating the primary storage block metadata to include an identifier of the access-granted compute node), performing the mirrored writing and following the completion of the mirrored writing wave the granted access and update the primary storage block metadata—for example by deleting the identifier of the access-granted compute node—so that the primary storage block metadata also indicate that the content of the primary storage block is consistent (equals the content of the secondary storage block).

The primary storage block metadata may further serve as a lock of the primary storage block, i.e., controls write access to the primary storage block by allowing only one compute node to write content to the primary storage block and to the associated secondary storage block.

When a compute node fails in the middle of a mirrored writing, the primary storage block metadata associated with primary storage block, may provide an indication of a potential inconsistency, for example, by including the identifier of the access-granted compute node.

Therefore, a subsequent access (by a compute node that differs from the access-granted compute node) toward the primary storage block may include detecting that a access-granted compute node failed, and may trigger a resolving of the the inconsistency prior to executing the access by the compute node, by copying the content of the primary storage block onto the secondary storage block.

FIG. 1A illustrates a method 601.

Method 601 may be executed by storage system such as but not limited to a large scale storage system.

Method 601 may start by step 610 of receiving, by a compute node of the storage system, a read request for reading a data unit stored at a primary storage block of the storage system.

The primary storage block may be included in the request, may be determined during step 610, and the like.

The primary storage block may be one or more primary storage entries, a primary storage address range of any size, and the like. The primary storage block may store one or more data units of any size. The primary storage block may be a logical entity or a physical entity. A storage node may have multiple primary storage blocks and/or multiple secondary storage blocks. Each storage device within the storage node may include multiple primary storage block and/or multiple secondary storage blocks. An SSD or NVRAM may have one or more parts of one or more primary storage block and/or one or more parts of one or more secondary storage blocks.

The compute node may receive the request from a requesting entity located outside the storage system (such as a client computer or server, or an application residing on a client computer)—or from an entity (such as another compute node of the storage system). The allocation of tasks (for example responding to access requests) between the compute nodes of the storage system can be done in any manner.

The allocation of primary storage blocks and secondary storage blocks can be done in any manner.

Step 610 may be followed by step 620 of determining, by the compute node and based on primary storage block metadata, whether a content of the primary storage block is consistent.

The primary storage block is consistent when the content of the primary storage block equals a content of a secondary storage block that corresponds to the primary storage block. The secondary storage block corresponds to the primary storage block in the sense that it has to store the replica of the content stored in the primary storage block.

The primary storage block metadata may be stored in one or more volatile memories of the storage system. The storage location metadata is accessible to the multiple compute nodes of the storage system. Each of the multiple primary storage blocks is associated with a primary storage block metadata, therefore the one or more volatile memories includes multiple instances of the primary storage block metadata.

Storing the instances of the primary storage block metadata in on or more volatile memories reduces the time of accessing, by the compute nodes, to the primary storage block metadata.

One or more copies of the primary storage block metadata can be stored.

Storing a single copy of the primary storage block metadata may simplify the management of the primary storage block metadata.

Having the primary storage block metadata accessible to the multiple compute nodes allows the compute nodes manage consistency issues in a decentralized manner.

Having a relatively simple process for determining consistency, allows the different compute node to maintain consistent primary locations very quickly.

Fixing inconsistent manners at least mostly when an inconsistent content is needed (when a content of a primary storage block has to accessed) is very efficient—and reduces the overall consistency operations.

The primary storage block metadata may be also used for access control—for example may be used as a lock mechanism for controlling access to the primary storage block, by allowing only one compute node to write to the primary storage block. The primary storage block metadata may be indicative of the compute node that is currently writing to the primary storage block.

The primary storage block metadata may indicate, explicitly or implicitly, conditionally or unconditionally, whether the content of the primary storage block is consistent.

The primary storage block metadata may include a failure indicator that indicates of an actual of suspected inconsistency failure, for example—the primary storage block metadata may indicate a failure of a volatile memory that stores the primary storage block metadata.

Step 620 may include checking whether the primary storage block metadata indicates a failure of a volatile memory that stores the primary storage block metadata. The failure may be a local or global power failure, or any other failure. For example, upon a power failure or a volatile memory failure, the instances of the primary storage block metadata of multiple primary storage blocks may be updated so as to indicate a suspected inconsistency failure.

Being used for access control the primary storage block metadata may store, for example, an indicator of whether any other compute node is granted access to the primary storage block if granted access the other compute node is referred to as an access-granted compute node. The indicator may further indicate an identity of the access-granted compute node. If there is no such access-granted compute node—the compute node may read the content of the primary storage block.

If there is, according to the primary storage block metadata, an access-granted compute node—the compute node may check whether the access-granted compute node is faulty (or inactive or stuck) or not—or whether the access-granted compute node does not utilize the access it was granted to the primary storage block.

The access-granted compute node may not utilize the access when the access-granted compute node is faulty—or when the access-granted compute node is not faulty—but the access is not utilized for any other reason.

Step 620 may be limited to reading the primary storage block metadata and determining, based on the primary storage block metadata whether the content of the primary storage block is consistent.

Step 620 may include reading the primary storage block metadata and performing at least one additional step. The at least one additional step may be executed before the reading, after the reading, or a combination thereof.

Step 620 may include attempting to gain access to the primary storage block, by reading the primary storage block metadata.

Step 620 may include accessing the primary storage block when the primary storage block metadata indicates that the primary storage block is free to access.

Step 620 may include responding to a finding that access to the primary storage block is granted to another compute node.

Step 620 may include determining that the primary storage block metadata indicates that there is an access-granted compute node and performing at least one out of:
a. Checking (or evaluating) the status of the access-granted compute node.
b. Checking whether the access-granted compute node utilizes the access to the primary storage block.
c. Attempting to communicate with the access-granted compute node.
d. Asking a further compute node to communicate with the access-granted compute node.
e. Gain access to the primary storage block.
f. Gain access to the primary storage block instead of the access-granted compute node when the access-granted compute node is faulty or when the access-granted compute node failed to utilize the access primary storage block.
g. Repeat step 620—for example after a predefined period, or upon any other event.
h. Update the primary storage block metadata to indicate that the compute node gained access to the primary storage block.

Step 620 may include determining that the access-granted compute node is inactive and/or that the access-granted compute node does not utilize the access to the primary storage block. This determining may include at least one out of:
a. Attempting to communicate with the access-granted compute node, and estimating that the access-granted compute node is faulty when the attempting fails.
b. Attempting to communicate with the access-granted compute node, and estimating that the access-granted compute node fails to utilize the access to the primary storage block when the communication fails.
c. Determining that the access-granted compute node is inactive and/or that access-granted compute node does not utilizes the access to the primary storage block when the access granted to the access-granted compute node for a consecutive period that exceeds a predefined grant period.
d. Having more than a single compute node fail to communicate with the other node.
e. Asking, by the compute node, from a further compute node to communicate with the access-granted compute node, and receiving, by the compute node, an indication that the further compute node also failed to communicate with the access-granted compute node.
f. Attempting, by the compute node, to communicate with the access-granted compute node; asking, by the compute node, and from a further compute node to communicate with the access-granted compute node, and receiving, by the compute node, an indication that the further compute node also failed to communicate with the access-granted compute node.

Step 620 may be followed by step 630 of responding to the determining.

Step 630 may include:
a. Reading the data unit from the primary storage block.
b. Updating the primary storage block metadata.
c. Gaining access to the primary storage block.
d. Revoking access of another compute node that was granted access to the primary storage block but was either faulty or did not utilize the access to the primary storage block.
e. When gaining access—updating the primary storage block metadata about the access gain. The revoking of access and/or the gaining of access may be implemented by updating the primary storage block metadata to indicate the identity of the compute node.
f. Copying the content of the primary storage block to a (corresponding) secondary storage block—in case that the primary storage block was found to be inconsistent.
g. Update the primary storage block metadata to indicate that the compute node waives access to the primary storage block—for example after successfully reading the data unit from the primary storage block—updating the primary storage block metadata accordingly.

When determining that the primary storage block is inconsistent then step 620 may be followed by step 630 of copying the data unit from the primary storage block to a secondary storage block of the storage system, and updating the primary storage block metadata to indicate that the primary storage block is consistent.

It should be noted that the determining that the primary storage block is inconsistent may also include determining that the primary storage block is suspected to be inconsistent.

When determining that the primary storage block is consistent then step 620 may be followed by step 640 of reading the data unit from the primary storage block and sending the data unit to the requesting entity.

When the primary storage block metadata is used as an access control means—and after the data unit was read—then step 640 may also include updating the primary storage block metadata to indicate that the compute node waives access to the primary storage block. This may include deleting a lock (unlocking) the indicates that the compute core is granted access to the primary storage block.

FIG. 1B illustrates an example of a method 602. Method 602 may start by step 610 of receiving, by a compute node of the storage system, a read request for reading a data unit stored at a primary storage block of the storage system.

Step 610 may be followed by step 620 of determining, by the compute node and based on primary storage block metadata, whether a content of the primary storage block is consistent.

Step 620 may be followed by step 630 of responding to the determining.

Method 602 may also include step 640 of receiving, by the compute node, a write request for writing a data unit to a primary storage block. The data unit may differ from the data unit that was read in step 610 or may be the same data unit. The primary storage block may differ from the primary storage block of step 610—but may be the same primary storage block. For simplicity of explanation it is assumed that the data unit of step 640 is another data unit.

Step 640 may be followed by step 650 of writing, concurrently, the other data unit to the primary storage block and to the secondary storage block and updating the primary storage block metadata.

Step 640 may be followed by step 642, and step 642 may be followed by step 644 of responding to the outcome of step 642.

Step 642 may include determining, by the compute node and based on primary storage block metadata, whether a content of the primary storage block is consistent.

Step 644 may include at least one out of a. Updating the primary storage block metadata.
b. Gaining access to the primary storage block.
c. Revoking access of another compute node that was granted access to the primary storage block but was either faulty or did not utilize the access to the primary storage block.
d. When gaining access—updating the primary storage block metadata about the access gain.

Step 644 may be followed by step 650.

Figure 1C:
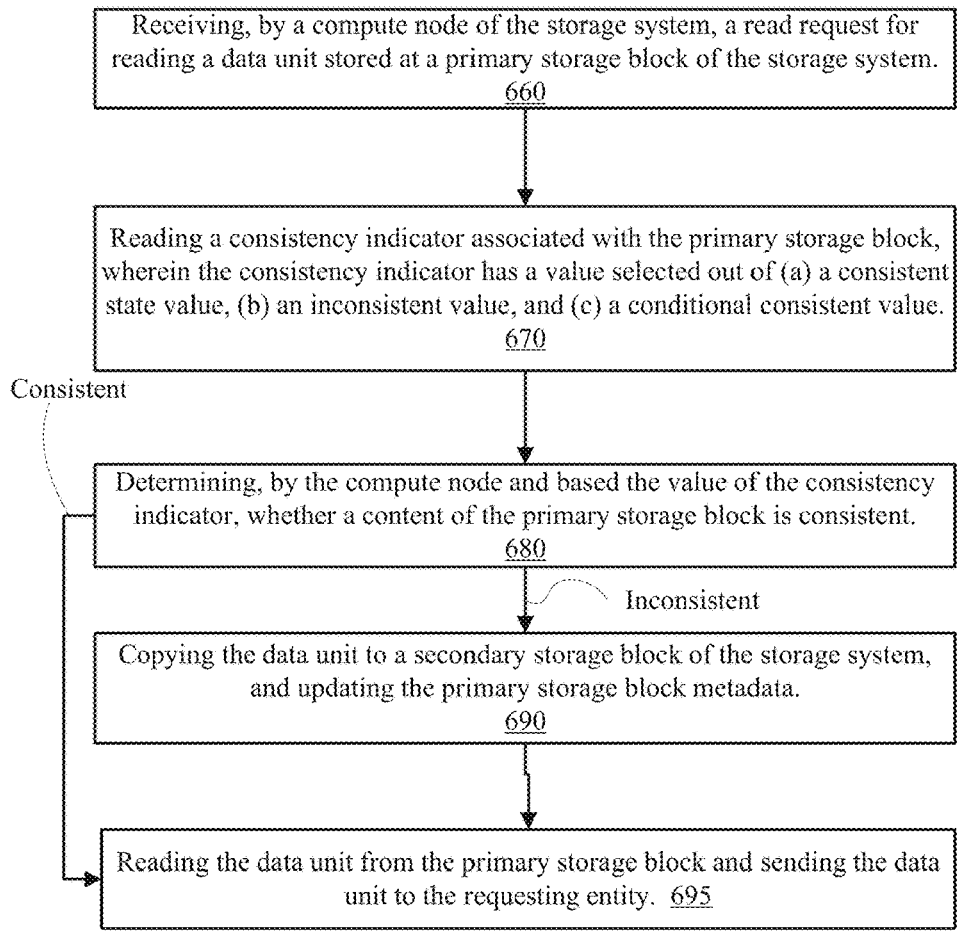
FIG. 1C illustrates an example of a method.

FIG. 1C illustrates method 603 for low-latency data mirroring in a storage system.

Method 603 may start by step 660 of receiving, by a compute node of the storage system, a read request for reading a data unit stored at a primary storage block of the storage system.

Step 660 may be followed by step 670 of reading a consistency indicator associated with the primary storage block, wherein the consistency indicator has a value selected out of (a) a consistent state value, (b) an inconsistent value, and (c) a conditional consistent value.

The conditional consistent value may be indicative of an identity of a compute node that currently has access to the primary storage block.

The inconsistent value may be indicative of a faulty compute node that currently has access to the primary storage block, or of a fault associated with a storage of the consistency indicator.

Step 660 may be followed by step 680 of determining, by the compute node and based the value of the consistency indicator, whether a content of the primary storage block is consistent. The determining may include any sub-steps of examples includes in step 620 of method 601.

Step 680 may be followed by step 690 of copying the data unit from the primary storage block to a secondary storage block of the storage system, and updating the primary storage block metadata (for example to indicate consistency, to update access rights, and the like), when determining that the primary storage block is inconsistent.

Method 603 may also include step 695 of reading the data unit from the primary storage block and sending the data unit to the requesting entity.

Step 680 may be followed by step 695—when determining that the primary storage block is consistent.

Step 690 may be followed by step 695.

Method 603 may also include receiving and responding to a write request.

Figure 2:
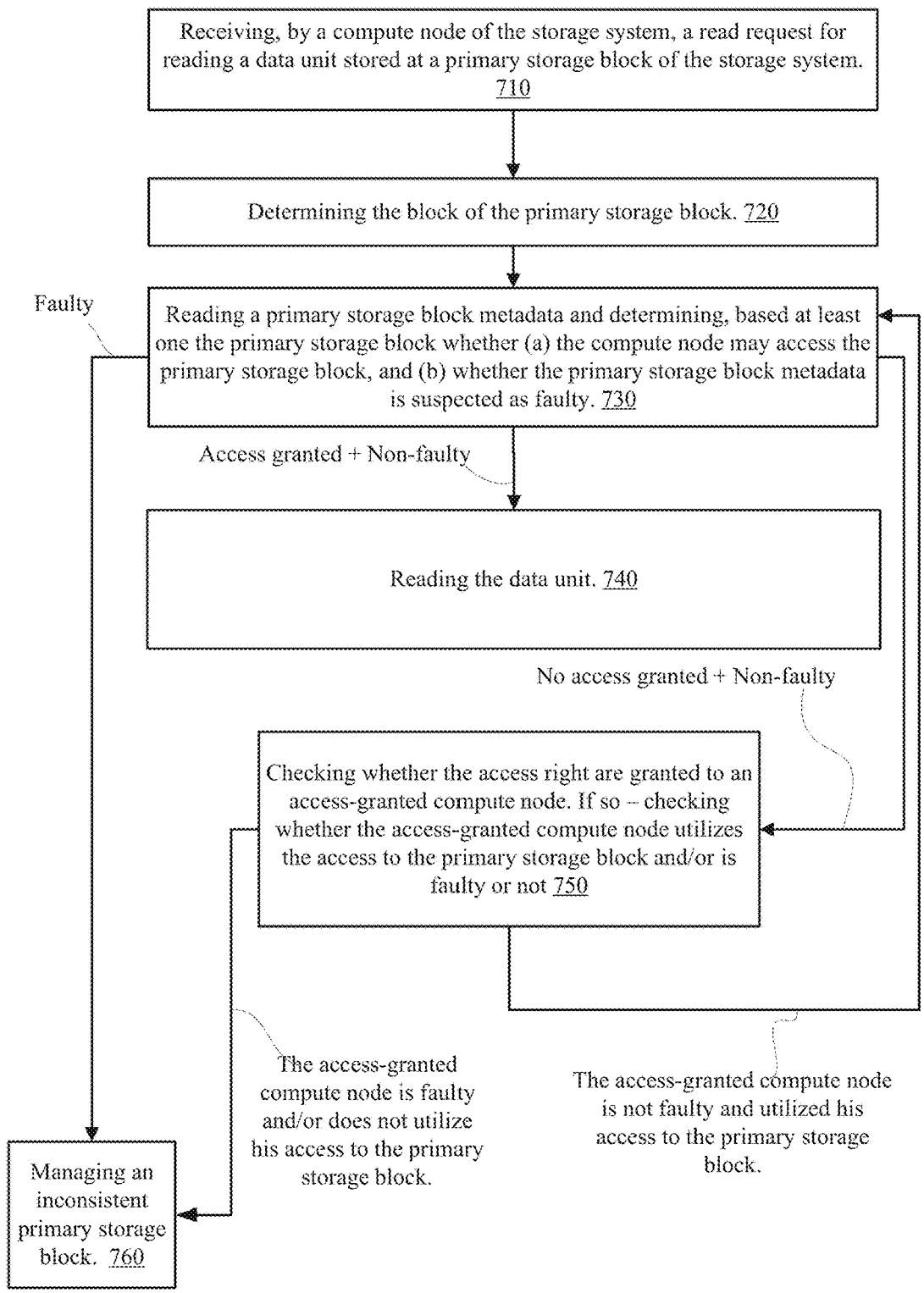
FIG. 2 illustrates an example of a method.

FIG. 2 illustrates an example of a method 700 for responding to a read request.

Method 700 may start by step 710 of receiving, by a compute node of the storage system, a read request for reading a data unit stored at a primary storage block of the storage system.

Step 710 may be followed by step 720 of determining the location of the primary storage block.

Step 720 may be followed by step 730 of reading a primary storage block metadata and determining, based at least one the primary storage block metadata whether (a) the compute node may access the primary storage block, and (b) whether the primary storage block metadata is suspected as faulty.
a. If, for example, the primary storage block metadata indicates that the primary storage block metadata is suspected as faulty—step 730 may be followed by step 760 of managing an inconsistent primary storage block (in the context of a read request).
b. If, for example, the primary storage block metadata indicates that the compute node may access the primary storage block and that the primary storage block metadata is not suspected as faulty—step 730 may be followed by step 740 of reading the data unit.
c. If, for example, the primary storage block metadata indicates that the compute node may not access the primary storage block and that the primary storage block metadata is not suspected as faulty—then jumping to step 750.

Step 750 may include:
a. Checking whether the access right are granted to an access-granted compute node. If so—checking whether the access-granted compute node utilizes the access to the primary storage block and/or is faulty or not.
b. If the access-granted compute node is not faulty and utilizes its access to the primary storage block—then repeating step 710.
c. If the access-granted compute node is faulty and/or does not utilize his access to the primary storage block—then jumping to step 760 of managing an inconsistent primary storage block (in the context of a read request).

Step 760 may include (a) reading the data unit, and (b) copying the content of the primary storage block to the secondary storage block, and (b) marking the primary storage block as consistent.

Figure 3:
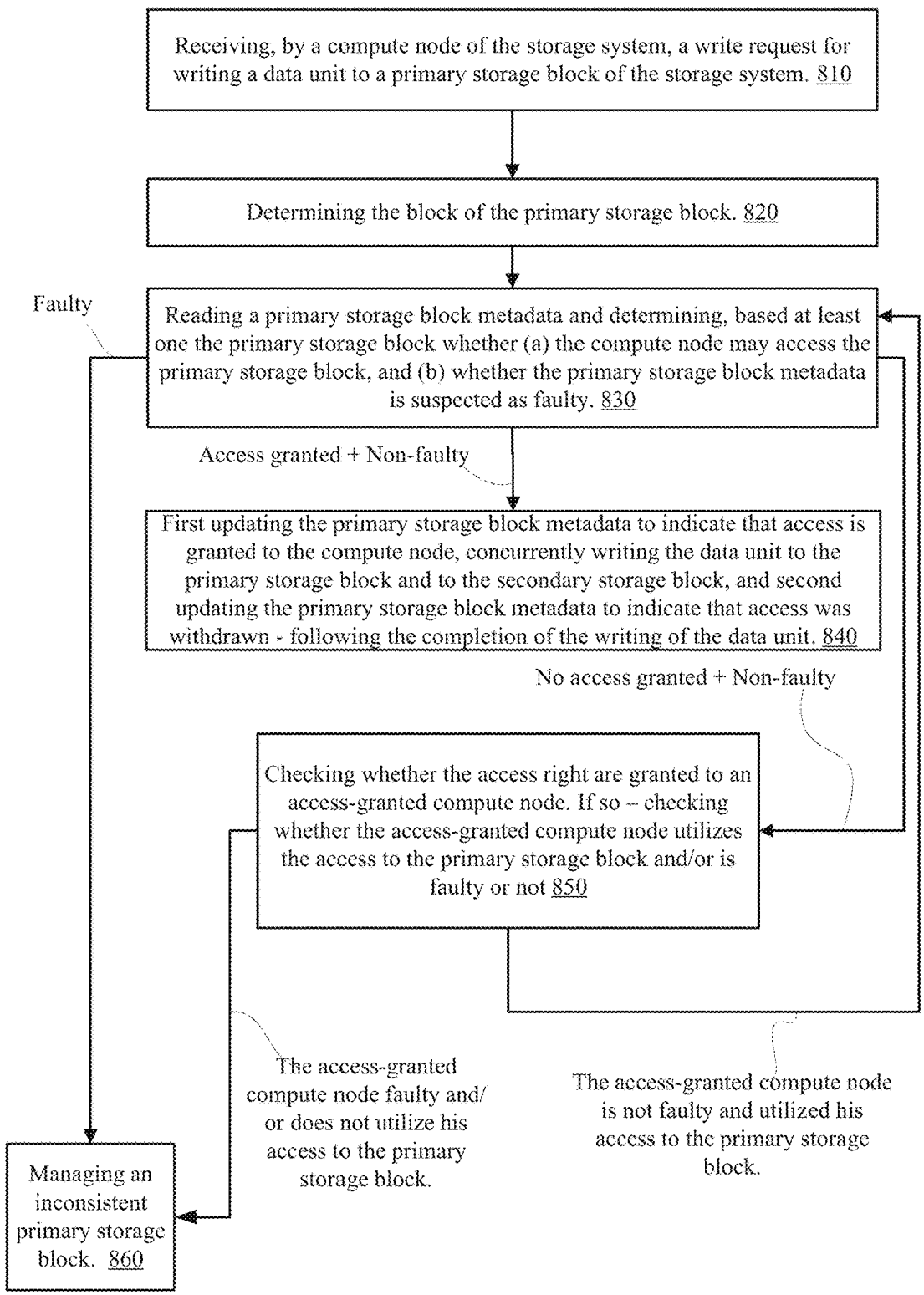
FIG. 3 illustrates an example of a method.

FIG. 3 illustrates an example of a method 800 for responding to a write request.

Method 800 may start by step 810 of receiving, by a compute node of the storage system, a write request for writing a data unit to a primary storage block of the storage system.

Step 810 may be followed by step 820 of determining the location of the primary storage block.

Step 820 may be followed by step 830 of reading a primary storage block metadata to determine whether (a) the compute node may access the primary storage block, and (b) whether the primary storage block metadata is suspected as faulty.
a. If, for example, the primary storage block metadata indicates that the primary storage block metadata is suspected as faulty—step 830 may be followed by step 860 of managing an inconsistent primary storage block (in the context of a write request).
b. If, for example, the primary storage block metadata indicates that the compute node may access the primary storage block and that the primary storage block metadata is not suspected as faulty—step 830 may be followed by step 840 of (a) first updating the primary storage block metadata to indicate that access is granted to the compute node, (b) concurrently writing the data unit to the primary storage block and to the secondary storage block, and (c) second updating the primary storage block metadata to indicate that the access was waived—following the completion of the writing of the data unit.
c. If, for example, the primary storage block metadata indicates that the compute node may not access the primary storage block and that the primary storage block metadata is not suspected as faulty—then jumping to step 850.

Step 850 may include:
a. Checking whether the access right are granted to an access-granted compute node. If so—checking whether the access-granted compute node utilizes the access to the primary storage block and/or is faulty or not.
b. If the access-granted compute node is not faulty and utilizes its access to the primary storage block—then repeating step 810.
c. If the access-granted compute node is faulty and/or does not utilize his access to the primary storage block—then jumping to step 860 of managing an inconsistent primary storage block (in the context of a write request).

Step 860 may include (a) first updating the primary storage block metadata to indicate that access is granted to the compute node, (b) concurrently writing the data unit to the primary storage block and to the secondary storage block, and (c) second updating the primary storage block metadata to indicate that access was withdrawn—following the completion of the writing of the data unit.

Figure 4A:
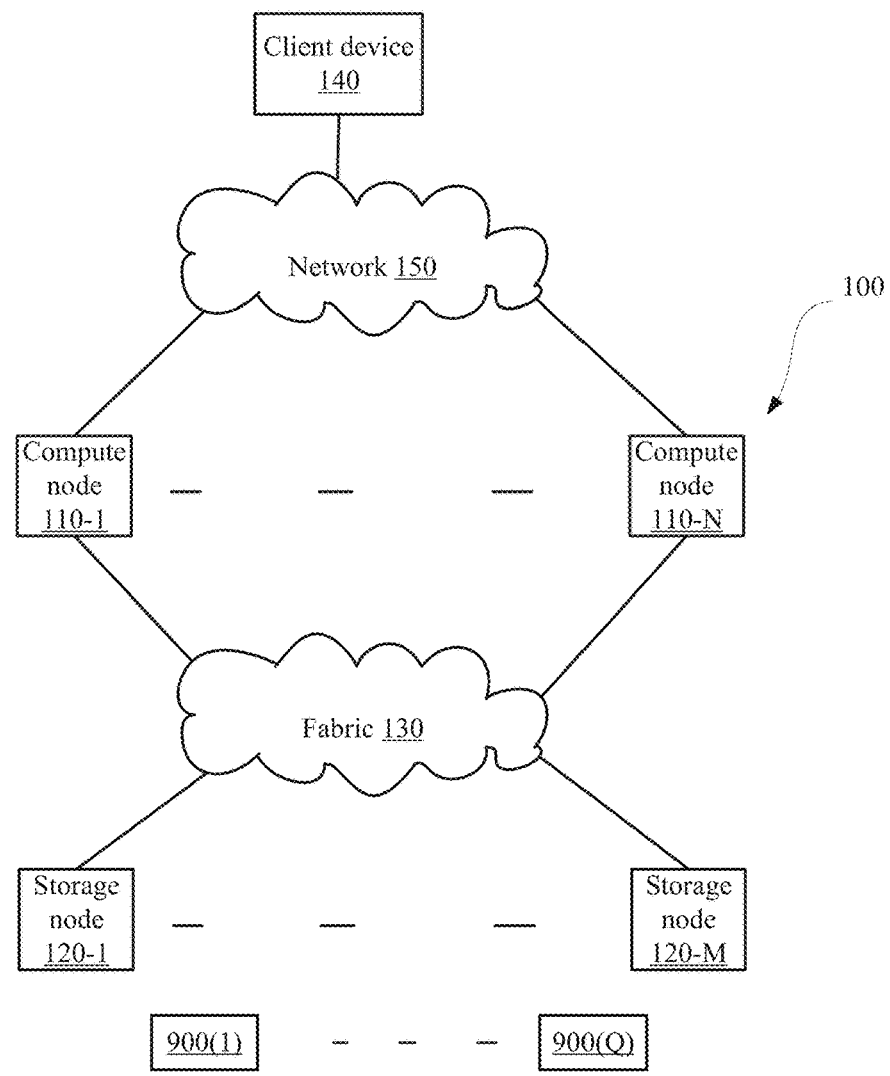
FIG. 4A is an example of a storage system.

FIG. 4A shows an example diagram of a storage system 100 according to the disclosed embodiments. The storage system 100 includes a number of N compute nodes 110-1 through 110-N (hereinafter referred to individually as a compute node 110 and collectively as compute nodes 110, merely for simplicity purposes, N is an integer equal to or greater than 1), a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 4D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 4C and 4D, each storage node 120 further includes a non-volatile random-access memory (NVRAM) and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniB and fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the communication fabric 130. It should be further noted that the compute nodes 120 can communicate with each other over the communication fabric 130. The communication fabric 130 is a shared fabric.

FIG. 4A also illustrates a primary storage block metadata 900(1)-900(Q), for multiple (Q) primary storage blocks supported by the storage nodes.

Figure 4B:
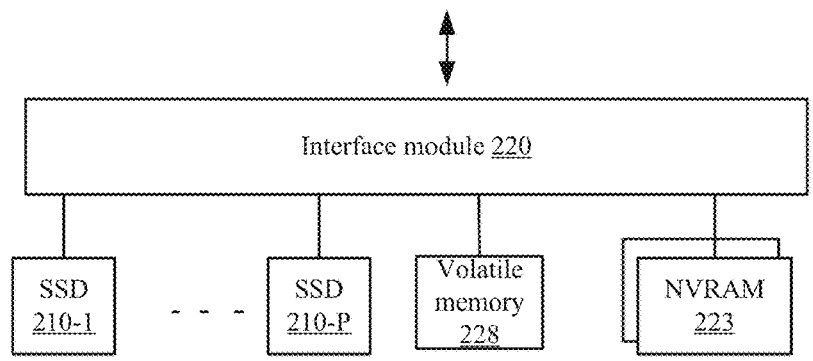
FIG. 4B is an example of a storage node.

FIG. 4B shows an example block diagram illustrating a storage node 120 according to an embodiment. The storage node 120 includes a plurality of storage devices such volatile memory 228, as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 4C:
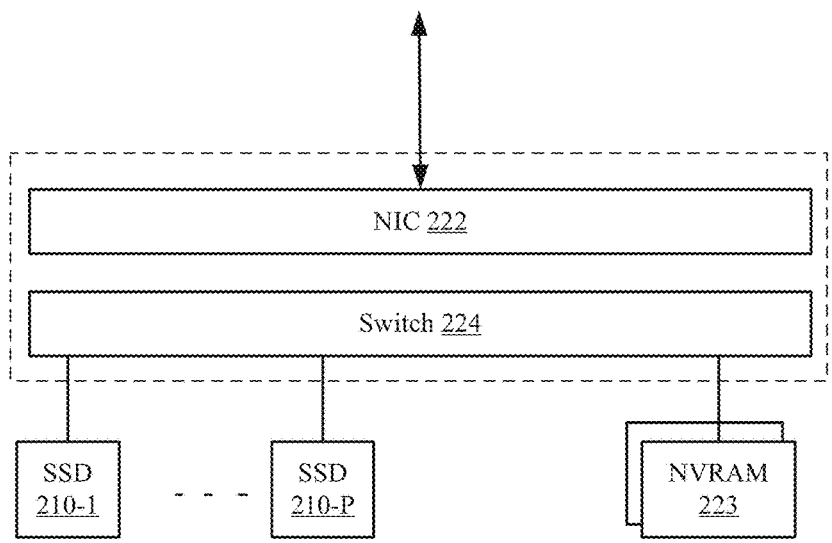
FIG. 4C is an example of an interface module of a storage node.

FIG. 4C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 4A) over the communication fabric (130, FIG. 4A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch.

In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 4D:
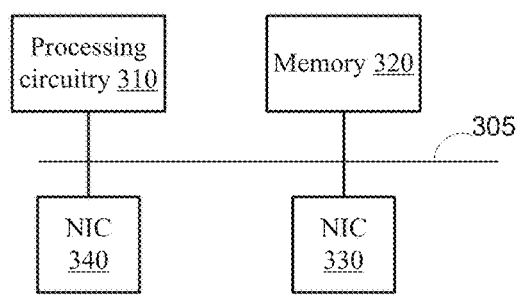
FIG. 4D is an example of a compute node.

FIG. 4D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 4A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 4A) through a communication network (e.g., the network 150, FIG. 4A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for low-latency data minoring in a storage system, the method comprising:
   receiving, by a compute node of the storage system, a read request for reading a data unit stored at a primary storage block of the storage system;
   determining, by the compute node and based on primary storage block metadata, whether a content of the primary storage block is consistent;
   responding to the determining of whether the content of the primary storage block is consistent;
   wherein the responding comprises:
      when determining that the primary storage block is inconsistent—copying the data unit from the primary storage block to a secondary storage block of the storage system, and updating the primary storage block metadata; and
      reading the data unit from the primary storage block and sending the data unit to a requesting entity.

2. The method according to claim 1 wherein the primary storage block metadata is stored in one or more volatile memories of the storage system.

3. The method according to claim 1 wherein the primary storage block metadata is a lock for controlling access to the primary storage block.

4. The method according to claim 1 wherein the determining whether the content of the primary storage block is consistent comprises checking whether access to the primary storage block is currently granted to an access-granted compute node of the storage system.

5. The method according to claim 4 wherein the checking is followed by evaluating a status of the access-granted compute node.

6. The method according to claim 5 wherein the evaluating comprises attempting to communicate with the access-granted compute node, and estimating that the access-granted compute node is faulty when the attempting fails.

7. The method according to claim 5 wherein the evaluating comprises attempting to communicate with the access-granted compute node, and estimating that the access-granted compute node fails to utilize the access to the primary storage block.

8. The method according to claim 5 wherein the evaluating comprises:
   requesting from a further compute node of the storage system to communicate with the access-granted compute node; and
   estimating that the access-granted compute node is inactive when the further compute node fails to communicate with the access-granted compute node.

9. The method according to claim 8 wherein the requesting from the further computer node is preceded by failing to communicate with the access-granted compute node.

10. The method according to claim 4 comprising gaining, by the compute node, access to the primary storage block, instead of the access-granted compute node.

11. The method according to claim 1, wherein the determining whether the content of the primary storage block is consistent comprises checking whether the primary storage block metadata comprises a failure indicator indicative of a failure in storing the primary storage block metadata.

12. The method according to claim 1, comprising:
   receiving, by the compute node, a write request for writing an other data unit to the primary storage block;
   writing, concurrently, the other data unit to the primary storage block and to the secondary storage block; and
   updating the primary storage block metadata.

13. The method according to claim 12 wherein the determining whether the content of the primary storage block is consistent comprises checking whether access to the primary storage block is currently granted to an access-granted compute node of the storage system.

14. The method according to claim 13 comprising gaining, by the compute node, access to the primary storage block, instead of the access-granted compute node.

15. The method according to claim 1 wherein the content of the primary storage block is consistent when the content of the primary storage block equals a content of the secondary storage block.

16. A non-transitory computer readable medium for low-latency data mirroring in a storage system, the non-transitory computer readable medium stores instructions for:
   receiving, by a compute node of the storage system, a read request for reading a data unit stored at a primary storage block of the storage system;
   determining, by the compute node and based on primary storage block metadata, whether a content of the primary storage block is consistent;
   responding to the determining of whether the content of the primary storage block is consistent;
   wherein the responding comprises:
      when determining that the primary storage block is inconsistent—copying the data unit from the primary storage block to a secondary storage block of the storage system, and updating the primary storage block metadata; and reading the data unit from the primary storage block and sending the data unit to a requesting entity.

17. A storage system that comprises multiple compute nodes and multiple storage nodes;
wherein a compute node of the multiple compute nodes is configured to:
receive a read request for reading a data unit stored at a primary storage block of the storage system;
determine, based on primary storage block metadata, whether a content of the primary storage block is consistent; and
respond to the determining of whether the content of the primary storage block is consistent;
wherein the respond comprises:
when determining that the primary storage block is inconsistent—copy the data unit from the primary storage block to a secondary storage block of the storage system, and update the primary storage block metadata; and
read the data unit from the primary storage block and sending the data unit to a requesting entity.

18. A method for low-latency data mirroring in a storage system, the method comprising:
receiving, by a compute node of the storage system, a read request for reading a data unit stored at a primary storage block of the storage system;
reading a consistency indicator associated with the primary storage block, wherein the consistency indicator has a value selected out of (a) a consistent state value, (b) an inconsistent value, and (c) a conditional consistent value;
determining, by the compute node and based the value of the consistency indicator, whether a content of the primary storage block is consistent;
copying the data unit to a secondary storage block of the storage system, and updating the consistency indicator, when determining that the primary storage block is inconsistent; and
reading the data unit from the primary storage block and sending the data unit to the requesting entity.

19. The method according to claim 18 wherein the inconsistent value is indicative of an identity of a access-granted compute node, the access-granted compute node is a compute node of the storage system that currently has access to the primary storage block.

20. The method according to claim 18 wherein the inconsistent value is indicative of a potential fault in a storage device that stores the consistency indicator.

21. The method according to claim 18 comprising determining access to the primary storage block metadata based on the consistency indicator.

* * * * *